(12) United States Patent
Ikai

(10) Patent No.: US 10,569,375 B2
(45) Date of Patent: Feb. 25, 2020

(54) CHIP SUCTION COVER AND MACHINE TOOL

(71) Applicant: DMG MORI CO., LTD., Yamatokoriyama-shi (JP)

(72) Inventor: Keisuke Ikai, Yamatokoriyama (JP)

(73) Assignee: DMG MORI CO., LTD., Yamatokoriyama-shi (JP)

( * ) Notice: Subject to any disclaimer, the term of this patent is extended or adjusted under 35 U.S.C. 154(b) by 441 days.

(21) Appl. No.: 15/290,458

(22) Filed: Oct. 11, 2016

(65) Prior Publication Data

US 2017/0136592 A1    May 18, 2017

(30) Foreign Application Priority Data

Nov. 16, 2015  (JP) ................. 2015-223737

(51) Int. Cl.
| | |
|---|---|
| *B23Q 11/00* | (2006.01) |
| *B23Q 11/08* | (2006.01) |
| *B24D 7/16* | (2006.01) |
| *B24B 55/04* | (2006.01) |
| *B24B 55/12* | (2006.01) |
| *B24B 55/06* | (2006.01) |

(52) U.S. Cl.
CPC ...... *B23Q 11/0046* (2013.01); *B23Q 11/0883* (2013.01); *B24B 55/04* (2013.01); *B24B 55/06* (2013.01); *B24B 55/12* (2013.01); *B24D 7/16* (2013.01)

(58) Field of Classification Search
CPC . B23Q 11/0046; B23Q 11/00; B23Q 11/0883; B24B 55/04; B24B 55/06; B24B 55/12
USPC .......................................... 173/213
See application file for complete search history.

(56) References Cited

U.S. PATENT DOCUMENTS 4,896,572 A  *  1/1990  Smyth ................. B23D 59/006
                                                      83/100
8,272,454 B2 *  9/2012  Kani .................... B23D 45/048
                                                      173/213
(Continued)

FOREIGN PATENT DOCUMENTS

| JP | H-04-54647 | * | 5/1992 |
| JP | H04-54647 |   | 5/1992 |
| JP | 2003-94216 |  | 4/2003 |

OTHER PUBLICATIONS

Translation of JPH-04-54647 (Year: 2019).*

*Primary Examiner* — Hemant Desai
*Assistant Examiner* — Veronica Martin
(74) *Attorney, Agent, or Firm* — Oblon, McClelland, Maier & Neustadt, L.L.P.

(57) ABSTRACT

A chip suction cover is used for a machine tool including: a spindle configured to rotate a tool; and a suction mechanism unit configured to suck chips of a workpiece that are produced in accordance with rotation of the tool. The chip suction cover includes: a hollow body that is provided with an opening through which a rotation central axis of the spindle extends and that is arranged so as to surround the tool; and a cover body that is provided in the hollow body so as to partially close the opening and that is configured to cover a part of a tip end portion of the tool while exposing a remaining part of the tip end portion of the tool. A chip suction cover having such a configuration that improves the efficiency of sucking chips produced due to workpiece machining is provided.

3 Claims, 3 Drawing Sheets

(56) References Cited

U.S. PATENT DOCUMENTS

| | | | |
|---|---|---|---|
| 2006/0046625 A1* | 3/2006 | Andreas | B23Q 11/0046 451/453 |
| 2009/0013842 A1* | 1/2009 | Rosskamp | B23D 47/005 83/523 |
| 2012/0238189 A1* | 9/2012 | Rosani | B23D 45/006 451/347 |
| 2012/0247799 A1* | 10/2012 | Hirabayashi | B25F 5/008 173/213 |
| 2013/0048328 A1* | 2/2013 | Chen | B25F 5/008 173/213 |
| 2013/0255983 A1* | 10/2013 | Rubens | B23Q 11/0046 173/75 |
| 2014/0352106 A1* | 12/2014 | King, Jr. | B28D 7/02 15/415.1 |
| 2016/0016241 A1* | 1/2016 | Taylor | B23D 45/062 83/100 |
| 2016/0332244 A1* | 11/2016 | Koegel | B23Q 17/2404 |
| 2017/0056988 A1* | 3/2017 | Guth | B23D 47/025 |
| 2017/0136592 A1* | 5/2017 | Ikai | B24B 55/04 |
| 2018/0236574 A1* | 8/2018 | Kume | B23D 59/006 |

\* cited by examiner

CHIP SUCTION COVER AND MACHINE TOOL

BACKGROUND OF THE INVENTION

Field of the Invention

The present invention relates to a cover for chip suction (which will be hereinafter referred to as a "chip suction cover") and a machine tool.

Description of the Background Art

As to conventional chip suction covers, for example, Japanese Patent Laying-Open No. 2003-94216 discloses a workpiece holding apparatus aiming to suck chips so as to be reliably removed while ensuring a sufficient amount of air inflow required for sucking the chips without impairing the function of preventing displacement and lift of a workpiece.

The workpiece holding apparatus disclosed in Japanese Patent Laying-Open No. 2003-94216 includes a bushing body through which a drill attached to a spindle is inserted. The bushing body has an inner circumferential surface provided with four ribs that come into contact with the workpiece. These four ribs are arranged so as to protrude inward in the radial direction. The four ribs are arranged such that their tip end portions are spaced apart from each other at a distance through which the drill can pass. The busing body has a lower end having a circumferential edge provided with an intake groove that is opened outward. The intake groove is provided so as to communicate with a groove-shaped space between the ribs adjacent to each other.

SUMMARY OF THE INVENTION

As disclosed in the above-described Japanese Patent Laying-Open No. 2003-94216, there is a known method of attaching a cover body to a tool attached to a spindle for the purpose of sucking chips that are produced due to workpiece machining. However, depending on the position, the type and the like of workpiece machining, the opening of the cover body may partially extend beyond the surface of the workpiece. In such a case, since a closed space cannot be provided around the tool attached to the spindle, the force for sucking chips cannot be sufficiently increased, which leads to a problem that chips are scattered around.

Accordingly, in order to solve the above-described problem, the present invention aims to provide a chip suction cover that improves the efficiency of sucking chips produced due to workpiece machining, and a machine tool including the chip suction cover.

A chip suction cover according to the present invention is used for a machine tool including: a spindle configured to rotate a tool; and a suction mechanism unit configured to suck chips of a workpiece that are produced in accordance with rotation of the tool. The chip suction cover includes: a hollow body provided with an opening through which a rotation central axis of the spindle extends, the hollow body being arranged so as to surround the tool; and a cover body provided in the hollow body so as to partially close the opening, the cover body being configured to cover a part of a tip end portion of the tool while exposing a remaining part of the tip end portion of the tool when seen from an axis direction of the rotation central axis of the spindle.

According to the present invention, it becomes possible to provide a chip suction cover that improves the efficiency of sucking chips produced due to workpiece machining, and a machine tool including the chip suction cover.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
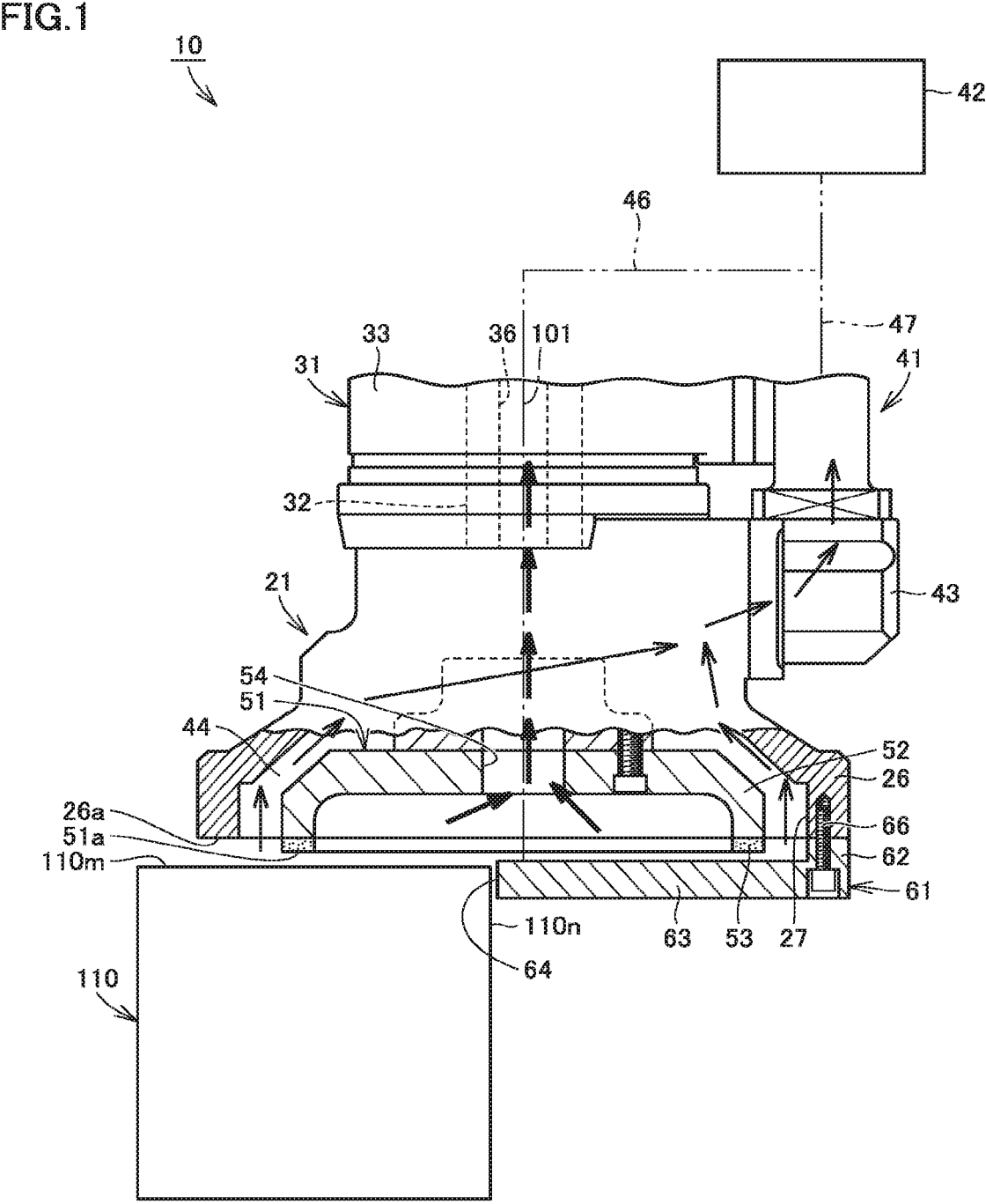
FIG. 1 is a diagram partially showing a machine tool having a chip suction cover according to an embodiment of the present invention.

The embodiment of the present invention will be hereinafter described with reference to the drawings, in which the same or corresponding components are designated by the same reference characters.

Figure 2:
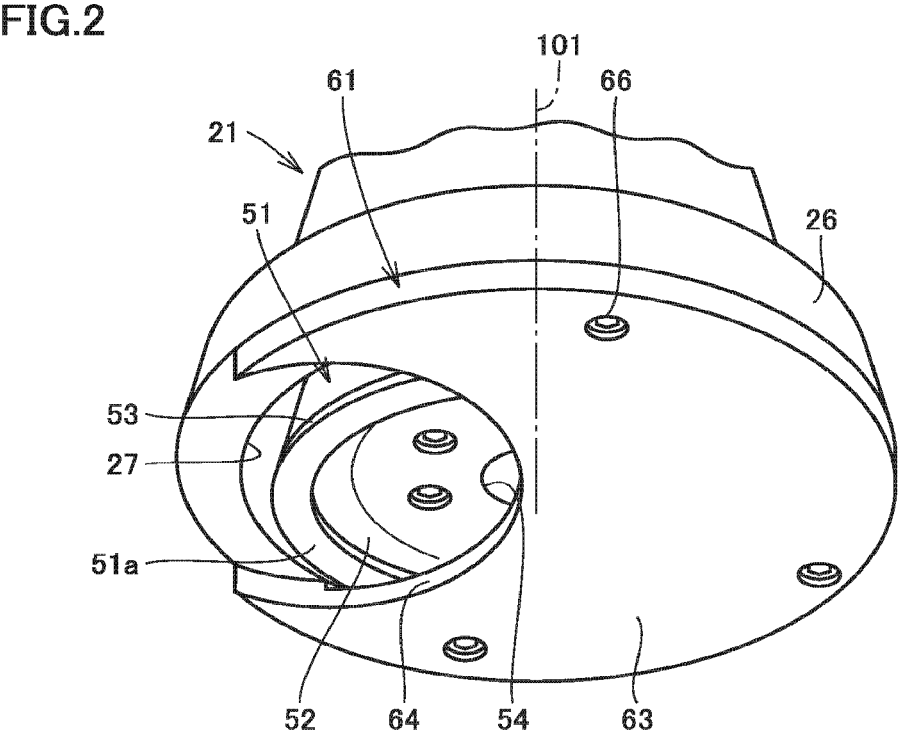
FIG. 2 is a perspective view of the chip suction cover in FIG. 1 as seen from below.
Figure 3:
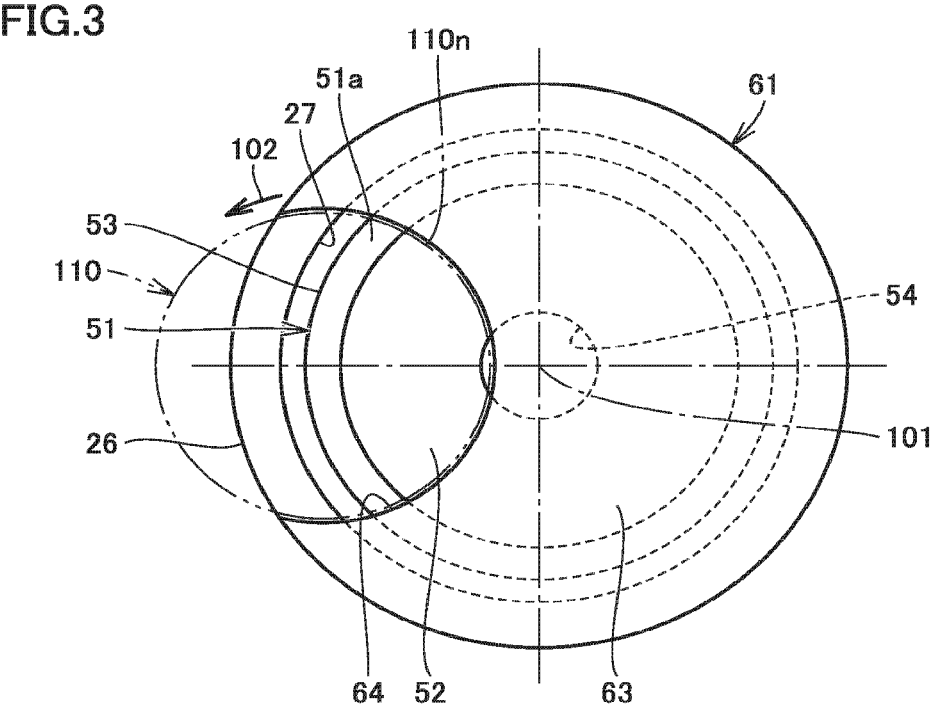
FIG. 3 is a bottom view showing the chip suction cover in FIG. 1.

FIG. 1 is a diagram partially showing a machine tool having a chip suction cover according to the embodiment of the present invention. FIG. 2 is a perspective view of the chip suction cover in FIG. 1 as seen from below. FIG. 3 is a bottom view showing the chip suction cover in FIG. 1.

Referring to FIGS. 1 to 3, a machine tool 10 in the present embodiment is a vertical machining center. Machine tool 10 includes a spindle head 31, a table (not shown), a chip suction cover 21, and a suction mechanism unit 41.

Spindle head 31 has a spindle housing 33 and a spindle 32. Spindle 32 is provided so as to be driven to rotate around a central axis 101 extending in the vertical direction. Central axis 101 corresponds to the rotation central axis of spindle 32. Spindle 32 passes through spindle housing 33. A tool 51 is clamped to spindle 32. Tool 51 rotates around central axis 101 in accordance with rotation of spindle 32.

A workpiece 110 is mounted on a palette on a table (not shown). In the present embodiment, workpiece 110 is formed in a cylindrical shape having a top surface 110*m* and an outer circumferential surface 110*n*. At least one of spindle head 31 and the table is moved, thereby changing the position of workpiece 110 machined by tool 51. As a representative example, spindle head 31 moves in the vertical axis direction. The table moves in the horizontal biaxial directions that are orthogonal to each other, and the palette on the table rotates around the vertical axis.

The type of tool 51 is not particularly limited, but, by way of example, may be a grinding tool, a milling cutter, an end mill, and the like. In the present embodiment, tool 51 is a grinding tool. The following is an explanation about the case where top surface 110*m* of workpiece 110 is ground by tool 51.

Tool 51 is formed of components including a base portion 52 and a grindstone portion 53. Base portion 52 is made of metal. Base portion 52 is clamped by spindle 32. Base portion 52 protrudes from spindle 32 in the axis direction of central axis 101 and has a tip end formed in a circular saucer shape. Grindstone portion 53 is made of a grindstone. Grindstone portion 53 is fixed to the end of base portion 52. Grindstone portion 53 is arranged so as to circle around central axis 101 in a belt-like manner.

Tool 51 has a tip end portion 51*a*. Tip end portion 51*a* is provided at the end portion of tool 51 in the axis direction of central axis 101. Tip end portion 51*a* is formed of a surface of grindstone portion 53. This surface serves as a contact with workpiece 110 during grinding machining. Tip end portion 51a is arranged in the plane that is orthogonal to central axis 101.

Chip suction cover 21 serves as a cover body for preventing scattering of chips during suction of these chips by suction mechanism unit 41, which will be described later.

Chip suction cover 21 has a hollow body 26 and a cover body 61. Hollow body 26 is attached to spindle head 31 (spindle housing 33). Hollow body 26 is attachable to and detachable from spindle head 31 (spindle housing 33).

Hollow body 26 is provided so as to surround tool 51. Hollow body 26 has an opening 27. Central axis 101 extends through opening 27. Hollow body 26 has a shape extending from spindle head 31 (spindle housing 33) so as to be formed around central axis 101 in a hollow manner. Hollow body 26 has an end at which opening 27 is provided. Opening 27 has a circular aperture plane. The aperture plane of opening 27 faces top surface 110m of workpiece 110 during grinding machining of workpiece 110.

At the end portion of hollow body 26 extending around central axis 101 in a hollow manner, a tip end portion 26a is provided. Tip end portion 51a of tool 51 protrudes beyond tip end portion 26a of hollow body 26 in the axis direction of central axis 101. There is a gap between hollow body 26 and tool 51.

Suction mechanism unit 41 is configured to suck the chips of workpiece 110 that are produced in accordance with rotation of tool 51. More specifically, suction mechanism unit 41 includes a dust collector 42, pipe lines 46 and 47, and a chip suction pipe 43.

Dust collector 42 is placed outside machine tool 10. Pipe line 46 is provided so as to connect dust collector 42 and spindle 32. Spindle 32 is provided with a through hole 36 that extends in the axis direction of central axis 101. Tool 51 (base portion 52) is provided with a chip introducing hole 54. Chip introducing hole 54 passes through tool 51 (base portion 52) in the axis direction of central axis 101 so as to communicate with through hole 36.

Pipe line 47 is arranged so as to connect dust collector 42 and chip suction pipe 43. Chip suction pipe 43 is coupled to hollow body 26. A chip introducing path 44 is formed by a gap between hollow body 26 and tool 51. Chip introducing path 44 communicates with chip suction pipe 43.

The chips of workpiece 110 that are produced in accordance with rotation of tool 51 are sucked through chip introducing hole 54, through hole 36 and pipe line 46 into dust collector 42 (spindle suction), and also sucked through chip introducing path 44, chip suction pipe 43 and pipe line 47 into dust collector 42 (external suction).

In the present embodiment, an explanation has been given with regard to the case where suction mechanism unit 41 is configured to suck the chips of workpiece 110 by means of both of spindle suction and external suction, but without limitation thereto, the configuration implementing only one of spindle suction and external suction may be applied.

The structure of cover body 61 included in chip suction cover 21 will be hereinafter described in detail.

Cover body 61 is attached to hollow body 26. Cover body 61 is fastened to hollow body 26 using a plurality of bolts 66. Thereby, cover body 61 is attachable to and detachable from hollow body 26.

Cover body 61 is provided so as to partially close opening 27. When seen from the axis direction of central axis 101, cover body 61 is provided so as to cover a part of tip end portion 51a of tool 51 while exposing a remaining part of tip end portion 51a of tool 51.

More specifically, cover body 61 is formed of components including a base portion 62 and a flat plate portion 63. Base portion 62 is provided so as to extend in a belt-like manner around central axis 101 in its circumferential direction. Base portion 62 is laid on tip end portion 26a of hollow body 26. Base portion 62 is formed to have a fixed thickness from tip end portion 26a. Base portion 62 of cover body 61 is fastened to hollow body 26.

Flat plate portion 63 extends in a flat plate shape in a plane orthogonal to central axis 101. Flat plate portion 63 extends from base portion 62 to protrude inward in the radial direction centering on central axis 101. Flat plate portion 63 faces tool 51 with a gap provided therebetween in the axis direction of central axis 101. Cover body 61 (flat plate portion 63) is provided so as to protrude beyond tip end portion 51a of tool 51 in the axis direction of central axis 101.

Flat plate portion 63 is provided with a cutout portion 64. Tip end portion 51a of tool 51 is exposed from cover body 61 at the position where this tip end portion 51a faces cutout portion 64 in the axis direction of central axis 101. When seen from the axis direction of central axis 101, cutout portion 64 is formed by cutting out a part of the outer circumferential edge of flat plate portion 63. Cutout portion 64 has a shape along outer circumferential surface 110n of workpiece 110, that is, an arc-shaped cutout edge. The curvature of the cutout edge of cutout portion 64 is equal to the curvature of outer circumferential surface 110n of workpiece 110.

During grinding machining of workpiece 110, workpiece 110 is arranged at cutout portion 64. At this time, the cutout edge of cutout portion 64 extends along outer circumferential surface 110n of workpiece 110. For example, workpiece 110 is rotated in the direction shown by an arrow 102 in FIG. 3 while maintaining the state where workpiece 110 is arranged at cutout portion 64. Thereby, top surface 110m of workpiece 110 is ground by tool 51.

In the present embodiment, a part of opening 27 in hollow body 26 that extends beyond top surface 110m of workpiece 110 is closed by cover body 61. Accordingly, the inside area of hollow body 26 can be brought into a state similar to a closed space. Thereby, the efficiency of sucking the chips of workpiece 110 can be improved, so that scattering of the chips can be prevented.

Figure 4:
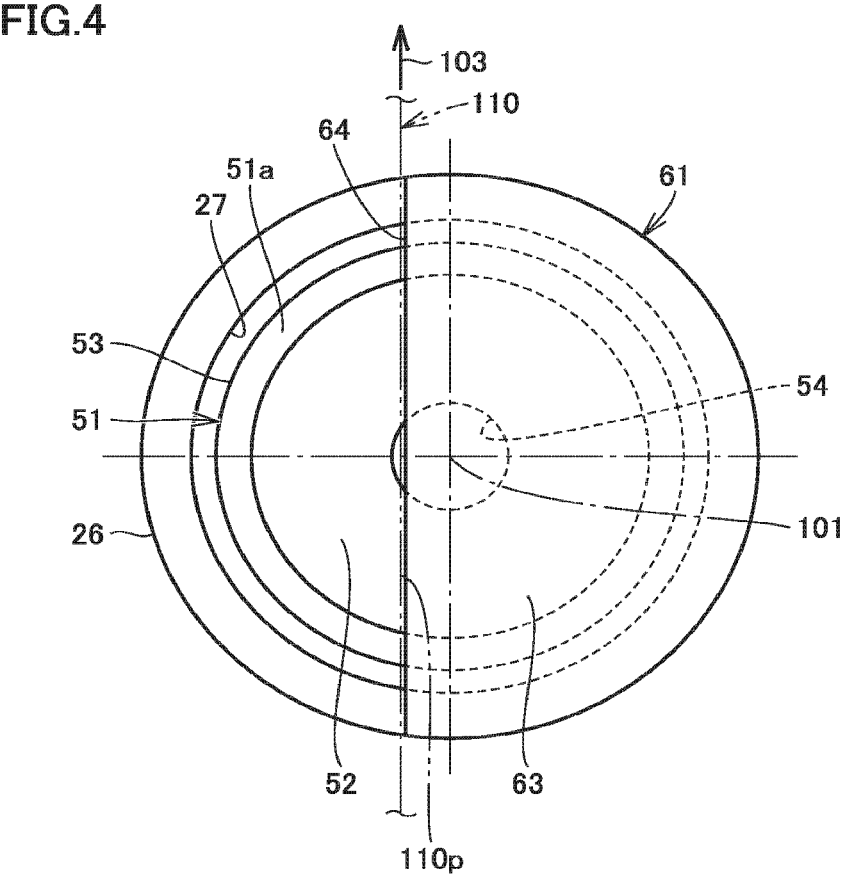
FIG. 4 is a bottom view showing a modification of a cover body in FIG. 3.

FIG. 4 is a bottom view showing a modification of the cover body in FIG. 3. Referring to FIG. 4, in the present modification, workpiece 110 has a side surface 110p formed in a planar shape. Cutout portion 64 has a shape along side surface 110p of workpiece 110, that is, a linear-shaped cutout edge.

Also in the present modification, workpiece 110 is arranged at cutout portion 64 during grinding machining of workpiece 110. At this time, the cutout edge of cutout portion 64 extends along side surface 110p of workpiece 110. For example, workpiece 110 is moved in the direction shown by an arrow 103 in FIG. 4 while maintaining the state where workpiece 110 is arranged at cutout portion 64. Thereby, top surface 110m of workpiece 110 is ground by tool 51.

The shape of cutout portion 64 provided in cover body 61 is not particularly limited, but is changed as appropriate so as to conform to the shape of the workpiece that is to be machined.

The following is a summarized explanation about the structure of chip suction cover 21 in the embodiment of the present invention. Specifically, a chip suction cover 21 in the present embodiment is used for a machine tool 10 including:

a spindle 32 configured to rotate a tool 51; and a suction mechanism unit 41 configured to suck chips of workpiece 110 that are produced in accordance with rotation of tool 51. Chip suction cover 21 includes: a hollow body 26 that is provided with an opening 27 through which a rotation central axis of spindle 32 extends and that is arranged so as to surround tool 51; and a cover body 61 that is provided in hollow body 26 so as to partially close opening 27 and that is configured to cover a part of a tip end portion 51a of tool 51 while exposing a remaining part of tip end portion 51a of tool 51.

According to chip suction cover 21 and machine tool 10 in the embodiment of the present invention that are configured in this way, even if chip suction cover 21 extends beyond the workpiece during machining or the like of the end portion of the workpiece, the area around tool 51 can be brought into a state similar to a closed space by cover body 61. Thereby, the efficiency of sucking chips can be improved, so that scattering of the chips can be prevented. Consequently, the operation of cleaning the chips after completion of machining can be readily done.

Although an explanation has been given in the present embodiment with regard to chip suction cover 21 in which hollow body 26 and cover body 61 are separately provided, the present invention is not limited thereto, but may be a chip suction cover in which a hollow body and a cover body are integrally provided. The chip suction cover in the present invention is more suitably applied to flattening machining of the workpiece using a grinding tool or a milling cutter.

The chip suction cover according to the present invention is used for a machine tool including: a spindle configured to rotate a tool; and a suction mechanism unit configured to suck chips of a workpiece that are produced in accordance with rotation of the tool. The chip suction cover includes: a hollow body that is provided with an opening through which a rotation central axis of the spindle extends and that is provided so as to surround the tool; and a cover body that is provided in the hollow body so as to partially close the opening and that is configured to cover a part of a tip end portion of the tool while exposing a remaining part of the tip end portion of the tool when seen from an axis direction of the rotation central axis of the spindle.

According to the chip suction cover configured in this way, even if the opening of the hollow body extends beyond the surface of the workpiece during machining of the workpiece, the inside area of the hollow body can be brought into a state similar to a closed space by arranging a cover body in a part of the opening that extends beyond the surface of the workpiece. Thereby, the efficiency of sucking the chips that are produced due to workpiece machining can be improved.

Further preferably, the cover body is provided so as to protrude beyond the tip end portion of the tool in the axis direction of the rotation central axis of the spindle.

According to the chip suction cover configured in this way, the cover body can be provided so as to cover a part of the tip end portion of the tool while exposing a remaining part of the tip end portion of the tool when seen from the axis direction of the rotation central axis of the spindle.

Further more preferably, the cover body is provided so as to be attachable to and detachable from the hollow body.

According to the chip suction cover configured in this way, the cover body can be attached to and detached from the hollow body in accordance with the conditions of the workpiece machining.

The machine tool according to the present invention includes: a spindle configured to rotate a tool; a suction mechanism unit configured to suck chips of a workpiece that are produced in accordance with rotation of the tool; and a chip suction cover according to any one described above.

According to the machine tool configured in this way, the efficiency of sucking the chips that are produced due to workpiece machining can be improved.

The present invention is mainly applicable to a machine tool including a suction mechanism for sucking chips of a workpiece.

Although the embodiments of the present invention have been described as above, it should be understood that the embodiments disclosed herein are illustrative and non-restrictive in every respect. The scope of the present invention is defined by the terms of the claims, and is intended to include any modifications within the meaning and scope equivalent to the terms of the claims.

What is claimed is:

1. A machine tool comprising:
   a spindle configured to rotate a tool, the spindle having a through hole that extends in an axis direction of a rotation central axis of the spindle;
   a suction mechanism unit configured to suck, through the through hole, chips of a workpiece that are produced in accordance with rotation of the tool; and
   a chip suction cover including
      a hollow body provided with a first opening through which the rotation central axis of the spindle extends, the hollow body being configured to surround an entire periphery of the tool in a plane that is perpendicular to the rotation central axis of the spindle; and
      a cover body provided in the hollow body that is configured to partially close the first opening, the cover body being configured to cover a part of a tip end portion of the tool while exposing a remaining part of the tip end portion of the tool when seen along the axis direction of the rotation central axis of the spindle, wherein
   the tool is provided with a chip introducing hole, the chip introducing hole passing through a base portion of the tool in the axis direction of the rotation central axis of the spindle to connect with the through hole, the base portion being configured to be clamped by the spindle, and
   the cover body is configured to cover a part of a second opening of the chip introducing hole in the base portion while exposing a remaining part of the second opening of the chip introducing hole when seen along the axis direction of the rotation central axis of the spindle.

2. The machine tool according to claim 1, wherein the cover body is configured to protrude beyond the tip end portion of the tool in the axis direction of the rotation central axis of the spindle.

3. The machine tool according to claim 1, wherein the cover body is configured to be attachable to and detachable from the hollow body.

* * * * *